United States Patent

[11] 3,625,531

| [72] | Inventor | Raoul Ranzenhofer<br>Pointe Claire, Quebec, Canada |
|---|---|---|
| [21] | Appl. No. | 866,655 |
| [22] | Filed | Oct. 15, 1969 |
| [45] | Patented | Dec. 7, 1971 |
| [73] | Assignees | Canadian International Paper Company<br>Montreal, Quebec, ;<br>Quebec North Shore Paper Company<br>Montreal, Quebec; Abitibi St. Anne Paper Ltd., Beaupre, Quebec, Canada, part interest to each |
| [32] | Priority | Oct. 18, 1968 |
| [33] | | Canada |
| [31] | | 032876 |

[54] VEHICLE STABILIZING MEANS
3 Claims, 3 Drawing Figs.

[52] U.S. Cl. ..................................... 280/6,
280/112
[51] Int. Cl. ........................................ B60s 9/00
[50] Field of Search........................... 280/6, 124,
112.1; 267/63

[56]  References Cited
UNITED STATES PATENTS

| 516,785 | 3/1894 | Bennett | 280/6 |
|---|---|---|---|
| 752,709 | 2/1904 | Quertier | 280/6 |
| 2,976,052 | 3/1961 | Hanna | 280/112.1 |
| 3,181,883 | 5/1965 | Kolbe | 280/112.1 |

*Primary Examiner*—Philip Goodman
*Attorney*—Jacobi, Lilling & Siegel

ABSTRACT: A log-handling vehicle consisting of a felling head attached to the free end of an extendible and retractable boom carried by the vehicle which preferably is of the articulated type. To restrain tipping force the stabilizing is provided in the form of a spring or rubber pad for engagement with an abutment upon a selected degree of roll, of the vehicle. The rubber pad preferably is secured to the chassis and engageable with an axle pivotally attached to such chassis and carried by ground engaging means such as wheels.

INVENTOR
RAOUL RANJINHOFEN
BY
Craig, Antonelli, Stewart & Hill  ATTORNEYS

VEHICLE STABILIZING MEANS

This invention relates to improvements in stabilizing the chassis of a vehicle relative to its support where the chassis is mounted in an unsprung manner on the support which, for example, may be carriages including wheels and and axles.

The invention, in one aspect, relates to stabilizing the chassis of a vehicle wherein the chassis is supported on wheel and axle assemblies rigidly secured thereto and additionally supported by one or more wheel and axle assemblies pivotally attached to such chassis. An example of such vehicle is a tractor unit having relatively large rubber-tired wheels mounted on the chassis with a front axle assembly carrying smaller wheels to support the vehicle and provide directional control. In a vehicle of this type, the front axle is pivotally mounted to the chassis and accordingly does not provide any resisting force tending to prevent the vehicle from tipping.

The invention, in another aspect, relates to stabilizing the chassis of an articulated type vehicle. Articulated vehicles are well known and include a pair of chasses interconnected for articulated movement relative to one another. Articulated vehicles are basically of two common types, differing from one another in the manner in which they allow for roll. In one type, the coupling between the chasses allows for pivotal movement of one chassis relative to the other about a vertical axis and also about a horizontal axis. The latter pivotal movement is what is commonly referred to as roll. In the other type, the vehicle chasses are pivotally interconnected for movement about a vertical axis relative to one another and the axle member on one of the chasses is pivotally mounted for movement about a substantially horizontal axis. It is the latter type of articulated vehicle to which the present invention relates. Steering for vehicles of the first type is provided by an automobile type of arrangement where the front wheels are individually pivotally mounted about vertical axes. In the case of the articulated vehicles, steering is effected by moving one chassis relative to the other about the pivotal connection disposed on a vertical axis.

It will be readily apparent that in vehicles of the foregoing types, only one of the two vehicle ground supports resist overturning forces, that is, forces tending to upset the vehicle to one side or the other. Tipping forces in the past have not been of any great concern because of most vehicles having a relatively low center of gravity. Recent developments, however, in the mechanizing logging have resulted in vehicles being provided with heavy mechanical equipment such as for example felling heads mounted on the free and of extendible-retractable booms carried by vehicle tending to raise the vehicle's center of gravity. One such vehicle is disclosed in applicant's copending application Ser. No. 695,402 filed Jan. 4, 1968 which discloses an articulated self-propelled vehicle having a knuckle boom pivotally attached thereto with a felling head mounted on the free end of the boom. The felling head consists of a grapple and shear for felling standing trees and loading the same onto a bunk attached to the vehicle. The boom has a relatively large reach and it will be readily apparent lifting trees at full reach of the boom places large twisting and tilting forces on the vehicle. Overturning moments under such operations are even more acute when swaying of the vehicle and its superstructure occurs from movement of the vehicle. Moments such as these cannot be readily counteracted by repositioning the boom as is possible during the loading operation.

Another stabilizing problem common to all large-wheeled vehicles of the present type concerns the gyroscopic effect from wheel inertia, i.e., the load acting in the plane of a rotating wheel. When the axis of such rotating wheels is changed, the inertial forces react on the vehicle chassis and contribute to instability.

In order to overcome these and other stability problems, it has been found desirable to add additional support means to such vehicles so as to restrict and thereby control movement of the said vehicle chassis relative to the ground.

Attempts have been made to solve the problem of vehicle instability using hydraulic means, such as hydraulic cylinders or the like connected between axle members of the vehicle and the vehicle chassis or, alternatively, between the two vehicle chasses, hydraulic power for such cylinders being supplied from the vehicle's main hydraulic power means.

Apart from high expense, the prior proposal of using hydraulic supports has proven unsuccessful for a number of reasons, a prime one of which is the vulnerability to damage from terrain and debris. A further major drawback of the proposed hydraulic systems is that they are generally useful only under static conditions because for the same to be effective, they are used to lock the vehicle chassis to the axles, or, alternatively, directly engage the ground.

It is therefore a prime object of this invention to provide a stabilizing means for vehicles of the unsprung type which is of low cost, which requires a minimum of maintenance, is simple and dependable, and which is not prone to becoming easily damaged, and one which is operable for both dynamic and static conditions.

In accordance with a broad aspect of the present invention there is provided, in a vehicle having a chassis supported in an unsprung manner and including means allowing roll of one portion of the vehicle relative to another portion about a generally horizontal axis each of which portions are supported on the ground by wheels, carriages or the like, the improvement comprising one or more stabilizers interposed between said relatively movable portions selectively resisting torsional movement of one said portion relative to the other said portion about said horizontal axis and thus providing forces resisting moments tending to overturn the vehicle.

In accordance with another aspect of the present invention there is provided a vehicle of the articulated type having a first and second chassis pivotally interconnected one to the other for movement relative to one another and each supported by wheel assemblies or the like connected thereto, at least one of said wheel assemblies including axle means having a pair of wheels mounted thereon in spaced relation relative to one another and being pivotally connected to one of said chassis to permit roll of the chassis about a generally horizontal axis, the improvement comprising: spring means interposed between said pivotally mounted axle and said chassis to selectively resist roll movement of the chassis relative to said axle.

In accordance with a further aspect of the present invention, there is provided a vehicle of the type having a first and second chassis pivotally interconnected one to the other in such a manner as to allow movement therebetween about each of a vertical and horizontal axis, said chasses each being supported by wheel assemblies or the like, the improvement comprising: spring means interposed between said first chassis and said second chassis resisting movement of one chassis relative to the other about said horizontal axis.

The invention is illustrated by way of example in the accompanying drawings wherein.

Figure 1:
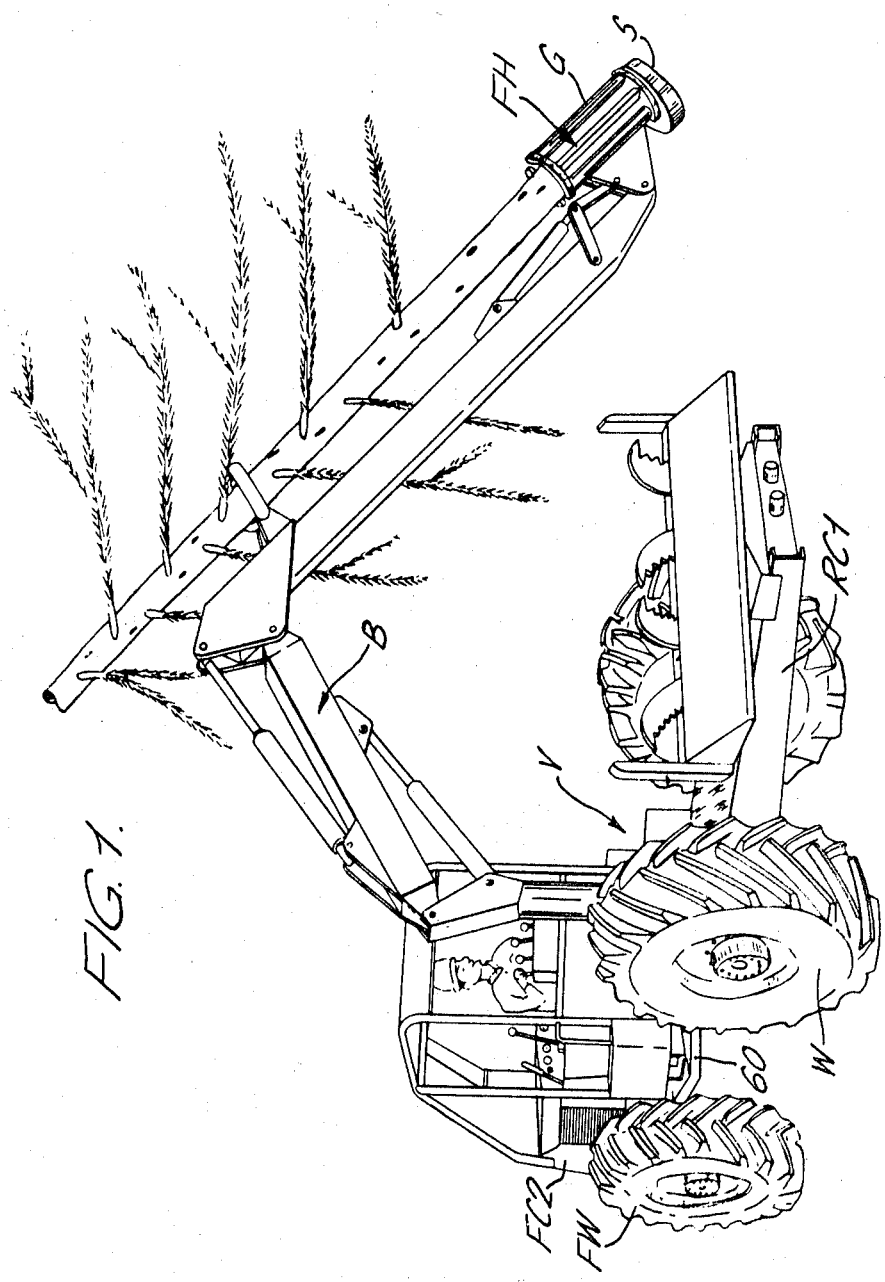
FIG. 1 is an oblique view of one type of logging vehicle incorporating the present invention.

Referring to the drawings, in FIG. 1 there is illustrated a log-handling vehicle which includes an extendible and retractible boom B pivotally mounted on a self-propelled vehicle V for swinging movement about a substantially vertical axis. A felling head FH is attached to the free end of the boom B and includes a tree-severing mechanism S attached to the lower end of a grapple G. The self-propelled vehicle V may be of the type having a chassis supported on rear wheels rigidly attached to the chassis and front wheels which are connected to the chassis by an axle pivotally joined to the chassis allowing for roll of the chassis about a generally horizontal axis. In such type vehicle it will be readily apparent only the rear wheels resist moments tending to overturn the vehicle sideways. Alternatively, the vehicle V may be of an articulated type having a front and rear chassis pivotally interconnected for movement relative to one another about a generally vertical axis. In such arrangement the rear chassis or the front chassis may be support by wheels or carriages rigidly attached thereto with the other chassis being mounted on a wheel and axle assembly with the axle assembly being pivotally attached to the chassis. The pivotal attachment in such instance allows for roll of the vehicle. Again, only one of the two sets of wheels provide resisting forces preventing overturning of the vehicle.

In each of the foregoing types of vehicles, it will be readily apparent that the felling head FH is movable toward and away from the vehicle by respectively retracting and extending the boom B. With the boom at a full reach position large moments are applied to the vehicle tending to overturn the same when the boom is in a position to one side of the vehicle or the other.

In the vehicle illustrated in FIG. 1, the rear wheels W are rigidly attached to a rear chassis RC1 pivotally connected to a front chassis FC2. The vehicle, accordingly, is an articulated type and the front chassis FC2 is supported by an axle 60 carried by a pair of front wheels FW. In accordance with the present invention, there is provided a stabilizer interposed between the front wheel assembly pivotally connected to the vehicle and the vehicle to resist pivotal movement of such wheel assembly whereby all the wheels contribute in resisting overturning forces to maintain the vehicle in an upright position.

Figure 2:
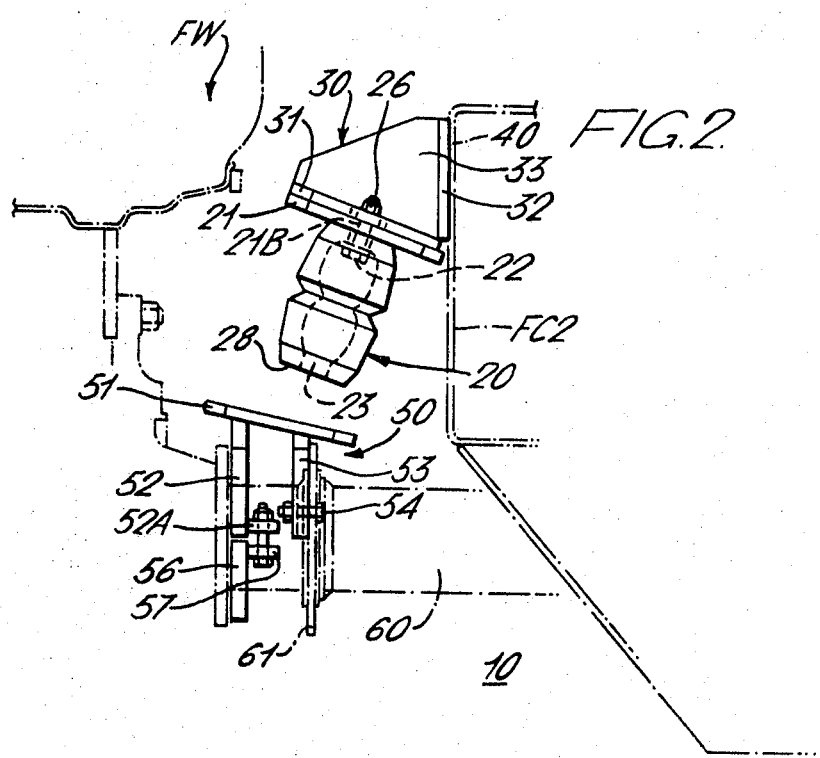
FIG. 2 is an enlarged fragmentary view of a portion of a vehicle chassis having an axle pivotally connected thereto and a stabilizer of one type interposed therebetween.
Figure 3:
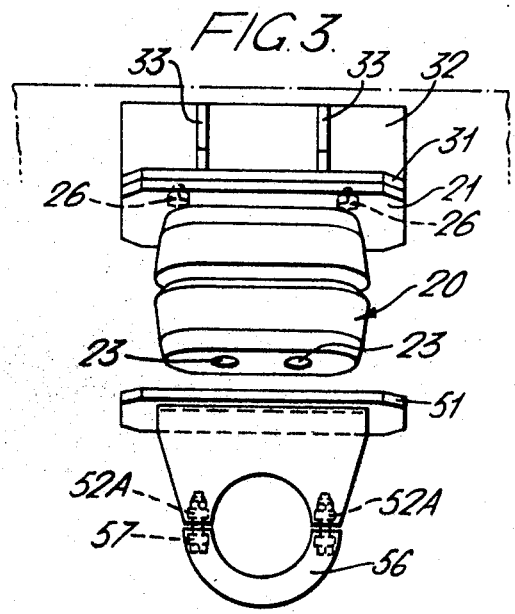
FIG. 3 is a left-hand side view of FIG. 2.

Referring to FIG. 2, there is illustrated a vehicle chassis stabilizer arrangement 10 comprising a rubber-spring component 20 secured to a portion 40 of the vehicle's front chassis FC2 by a bracket 30 and is positioned so as to selectively engage an abutment 50 attached to a vehicle axle 60. The axle member 60 is pivotally connected to the chassis FC2 in a well-known manner for movement about a generally horizontal axis extending longitudinally of the vehicle. The axle 60 is supported by a pair of wheels FW (only a portion of one being shown in FIG. 2) journaled thereon in any manner well known in the art.

The rubber-spring component 20 may be a commercially available product such as those known in the trade as "Ayon Hollow Rubber Springs," the word 'Ayon' being a trade name The characteristics of the spring may be selected as to provide suitable resisting forces and, as illustrated in FIG. 2, this is provided by a hollow Ayon member suitably ribbed and of particular shape. Alternatively, the rubber-spring component 20 may be a solid resilient member made of, for example, rubber or the like, or alternatively, may be steel coil springs, leaf springs or other spring members suitably shaped and positioned to engage the abutment 50.

The spring component 20 is secured to a mounting plate member 21 by a pair of bolts 22 inserted through aligned apertures 23 and 21B in their respective rubber spring component 20 and plate member 21. The heads of bolts 22 bear against bushing members bonded or otherwise secured to the rubber-spring component adjacent an end thereof opposite to an end 28 which engages the abutment 50. The mounting plate member 21, in turn, is detachably secured to a flange 31 of mounting bracket 30 attached to the chassis FC2, by a pair of bolt and nut assemblies 26. The bracket 30 further includes a pair of gusset members 33 welded or otherwise secured to the flange 31 and further flange 32, the latter of which is attached to the vehicle chassis FC2 as, for example, by welding, bolt and nut assemblies, or the like.

From the foregoing it is readily apparent the spring member 20 may be removed, either by separating the spring member from its mounting plate, 21, or alternatively, separating mounting plate member 21 from the flange 31.

The spring member 20 is so positioned as to selectively engage the abutment member 50 upon pivotal movement of the axle 60 relative to the chassis FC2. The abutment 50 comprises a plate member 51 positioned to engage the face 28 of rubber-spring member 20 and is attached to a pair of mounting flanges 52 and 53. The plate 51 is suitably chamfered at its corners and the flanges 52 and 53 may be welded to the plate and are located in spaced relation with respect to one another each having a cutout portion to receive a portion of the axle member 60. The flange 53 is bolted to a flange 61, secured to axle 60, by a pair of bolt and nut assemblies 54. The flange 53 is apertured to receive bolts 54 placing plate member 51 in suitable spaced relation with respect to the rubber member 20. If desired, several holes may be provided whereby plate member 51 may be selectively positioned at different positions relative to its facing from the end face 28 of rubber member 20. The flange 52 has a pair of lug members 52A secured thereto and projecting outwardly therefrom for receiving respective ones of a pair of bolts passing through a cap member 56 disposed on the opposite side of the axle. Cap member 56 is generally U-shaped to receive a portion of the axle 60 and has a pair of lugs 57 welded or otherwise secured thereto. The cap 56 is attached to the flange 52 by a pair of bolts 58 passing through lugs 57 and 52A attached to respective members 56 and 52.

As previously mentioned, the axle 60 is pivotally attached to the chassis FC2 and the stabilizer accordingly comes into effect upon selected pivotal movement of the axle relative to the chassis by virtue of the spring member end face 28 being spaced from the abutment 50. The chassis FC2 accordingly, is allowed to freely move relative to the axle 60 through a selected amount of roll and thereafter spring member 20 resists any further roll movement of the vehicle chassis. The arrangement illustrated in FIG. 2 is applicable to an articulated vehicle or a vehicle of the first described type, that is, a common tractor unit, or alternatively, an articulated vehicle having a front axle pivotally attached permitting roll of the chassis. For the sake of simplifying description, only a portion of the axle and frame assembly is illustrated in FIG. 2. It will be understood that the opposite end of the front axle is the mirror image of that illustrated in FIG. 2. The pair of stabilizers 20 are located one on each of opposite sides of the pivotal connection of the axle to the chassis. The spring end face 28 is spaced from the abutment 50 and, accordingly, stabilizing takes effect only after certain movement of the chassis relative to the axle. If desired, the end face 28 may at all times be in engagement with the abutments 50 and in such case the chassis FC2 would at all times be biased to a normal operative position relative to the axle.

In other words, the pivotally mounted axle would at all times provide forces tending to prevent overturning of the vehicle. With regards to the forces applied by spring member 20, the characteristics of the same may be selected such that the force required to compress the spring increases rapidly with compression of the spring.

From the foregoing it is seen there is provided an arrangement for stabilizing the vehicle chassis by restraining movement of the same regardless of whether the vehicle is moving or is in a stationary position.

I claim:

1. A unitary articulated vehicle particularly adapted for handling trees, logs and the like and having a pair of chasses pivotally interconnected for movement about a vertical axis permitting steering of the vehicle by pivoting one chassis relative to the other about said vertical axis and each supported in an unsprung manner on ground-engaging wheels, tracks or the like; means allowing roll of the wheel or like support of one of said pair of chasses relative to the wheel or the like support of the other of said pair of chasses about a horizontal axis extending lengthwise of said vehicle; and at least two springs interposed between said relatively movable portions providing roll, said springs being located respectively on opposite sides of said longitudinal axis progressively, increasingly, resisting roll movement of said one of said wheel supports relative to the other in each of opposite directions of rotation about said horizontal axis and thus providing forces resisting moments tending to overturn the vehicle.

2. A vehicle as defined in claim 1, wherein said one chassis is supported on a wheel assembly having an axle pivotally attached to such chassis and wherein the springs are interposed between said one chassis and the axle pivotally attached thereto.

3. A vehicle as defined in claim 1, wherein each of said springs comprises at least one abutment on one of said chasses, and a resilient member secured to the other of said pair of chasses, said pair of springs being spaced from their respective abutments at an initial at rest relative position of said pair of chasses thereby being engageable therewith upon a selected degree of roll of one chassis relative to the other about said horizontal axis.

* * * * *